Patented Mar. 22, 1938

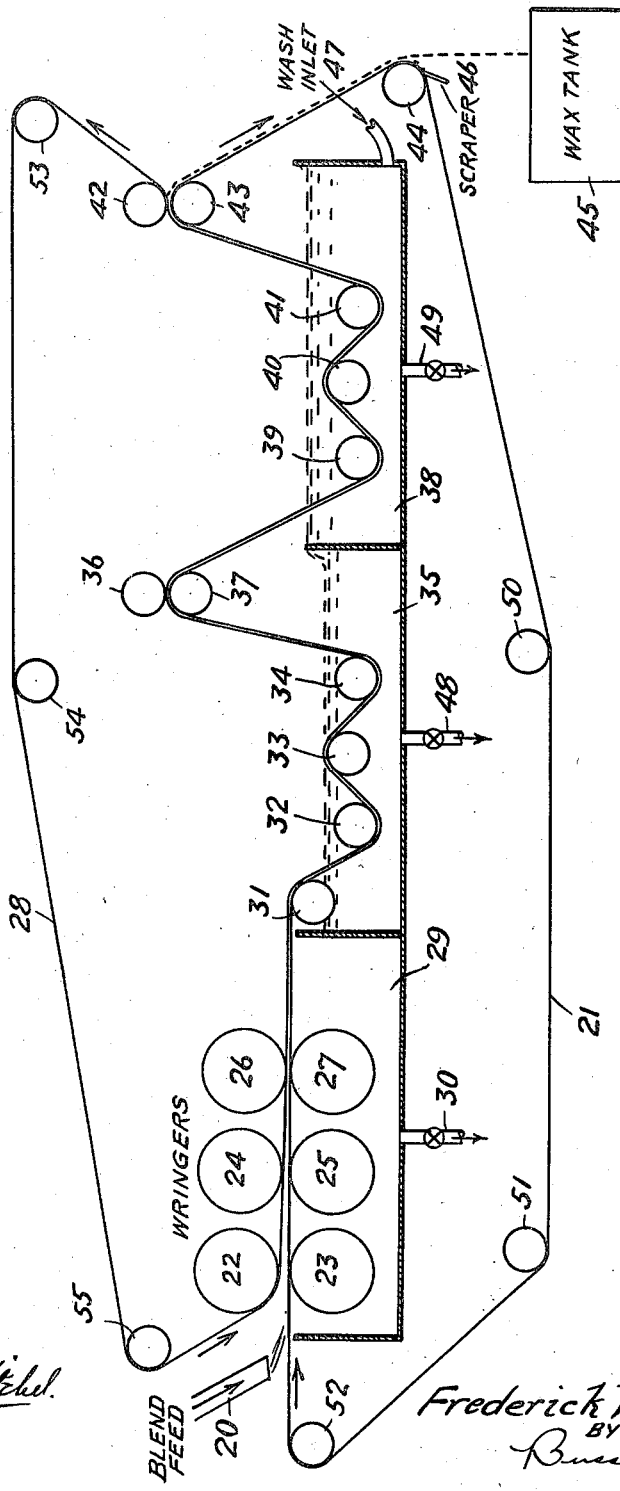

2,111,720

UNITED STATES PATENT OFFICE 2,111,720

FILTERING METHOD AND APPARATUS

Frederick W. Padgett, Ridley Park, Pa., assignor to Sun Oil Company, Philadelphia, Pa., a corporation of New Jersey Application March 13, 1936, Serial No. 68,613

6 Claims. (Cl. 210—198)

The present invention relates to a method and apparatus for filtering. It is an object of this invention to provide a method and apparatus for filtering which is capable of continuous operation and capable of handling relatively large amounts of a mixture to be filtered.

It is a further object of this invention to provide a method and apparatus for filtering which will yield a relatively dry filter cake.

The drawing is a diagrammatic representation of apparatus embodying my invention, and adapted for carrying out the process thereof.

Referring now to the drawing, the blend to be filtered, which may be a wax propane oil slurry, is introduced through line 20 and is distributed on a filter surface 21 which is in the form of a continuous belt. The filter surface 21 is continuously moving in the direction shown by the arrows and passes between cooperating pairs of rollers or wringers 22 and 23, 24 and 25, and 26 and 27. A continuous belt 28, which may either be impervious or a suitable filtering surface in the form of a continuous belt, also passes between the above mentioned cooperating pairs of rollers or wringers.

As shown in the drawing, each successive pair of wringers is spaced slightly closer together than the previous pair, so that the pressure applied to the mixture being filtered on filter surface 21 between filter surface 21 and belt 28, is gradually increased, so that most of the liquid contained in the mixture is squeezed out and falls into tank 29 from which it is removed through valved line 30, so that the filter cake between filter surface 21 and belt 28 as they pass over roller 31 is relatively dry. The filter surface 21 and belt 28 then pass over rollers 32, 33, and 34 in tank 35 in which there is maintained a bath of suitable wash solvent. The filter cake between filter surface 21 and belt 28 is flexed and broken as the belts pass over the rollers in tank 35, so that the wash solvent is worked into the cake and removes some of the oil which was not removed by the wringers over tank 29. The cake between belts 21 and 28 is quite wet as it emerges from the bath of solvent in tank 35 and therefore the two belts are passed between cooperating wringers 36 and 37 which squeeze the most of the liquid from the filter cake material, so that the material between the two belts as it enters a bath of liquid maintained in tank 38 is relatively dry. As the belts pass over rollers 39, 40, and 41 under the surface of a bath of suitable wash solvent maintained in tank 38, the wash solvent is worked into the filter cake material and washes any remaining oil therefrom. The filter cake material between the belts as they rise from the bath of liquid in tank 38 is relatively wet and therefore the belts are passed between the cooperating rollers and wringers 42 and 43 which wring any liquid from the filter cake material between the belts permitting it to fall back to tank 38 so that a relatively dry filter cake remains on belt 21 as it separates from belt 28.

Ordinarily, as the belts are separated the filter cake material will readily separate from them and then remain on the lower belt. However, if necessary, a scraper may be used to remove the material from the upper belt. As the belt or filter surface 21 passes over roller 44, the filter cake drops therefrom into wax tank 45, a suitable scraper 46 being used to remove any cake adhering to surface 21.

As shown in the drawing, the wash liquid is introduced into tank 38 through line 47 and overflows from tank 38 into tank 35, from which it is removed through valved line 48, and any liquid which is squeezed from the filter cake by rollers 36 and 37 falls into tank 35 and that squeezed from the filter cake by rollers 42 and 43 falls into tank 38. However, it is of course possible to remove the wash solvent used in tank 38 before it overflows into tank 35 by any suitable means as a valved line 49 and introduce fresh wash solvent into tank 35. It is also contemplated that the liquid squeezed from the filter cake by rollers 36 and 37 may be collected separately as by a trough placed under these rollers, and that removed by rollers 42 and 43 may be also collected by a trough placed under these rollers. It is, of course, to be understood that suitable guide rolls such as 50, 51 and 52 will be provided for filter surface or belt 21, and guide rolls such as 53, 54 and 55 will be provided for belt 28, some or all of these rolls being driven to impart the desired movement to the belts.

While I have herein shown and described a specific embodiment of my invention, it is apparent that various changes may be made in the apparatus shown and described herein without departing from the spirit of this invention or the scope of the appended claims.

What I claim and desire to protect by Letters Patent is as follows:

1. A filter comprising a filtering medium in the form of a continuous belt, means for depositing a mixture to be filtered on said belt, wringer rolls between which said belt travels and which are adapted to press liquid from said material and form a filter cake on the belt surface, a tank adapted to contain a bath of wash liquid, guide rolls in said tank over which said belt travels to cause it to enter a bath of liquid contained in said tank, wringer rolls between which said belt travels and which are adapted to press wash liquid from said filter cake, and means beyond said last named rolls for removing said filter cake from said belt.

2. A filter comprising a pair of continuous belts lying one on the other, one of which is a filter medium, means to introduce a mixture to be filtered to the space between said belts, wringer rolls between which said belts travel and which are adapted to press liquid from said material and form a filter cake between said belts, a tank adapted to contain a bath of a wash liquid, guide rolls for said belts in said tank to cause said belts to enter said bath, wringer rolls beyond said tank and between which said belts travel and which are adapted to press wash liquid from the filter cake between said belts, and means beyond said last named rolls to remove said filter cake from said filtering belt.

3. A filter comprising a pair of continuous belts lying one on the other, one of which is a filter medium, means to introduce a mixture to be filtered to the space between said belts, wringer rolls between which said belts travel and which are adapted to press liquid from said material and form a filter cake between said belts, a tank adapted to contain a bath of a wash liquid, guide rolls for said belts in said tank to cause said belts to enter said bath, means for flexing said belts in said tank, wringer rolls beyond said tank and between which said belts travel and which are adapted to press wash liquid from the filter cake between said belts, and means beyond said last named rolls to remove said filter cake from said filtering belt.

4. A filter comprising a pair of continuous belts lying one on the other, one of which is a filter medium, means to introduce a mixture to be filtered to the space between said belts, wringer rolls between which said belts travel and which are adapted to press liquid from said material and form a filter cake between said belts, a series of tanks adapted to contain wash liquid, guide rolls in each of said tanks to guide said belts into said tanks, wringer rolls beyond each of said tanks and between which said belts travel and which are adapted to press wash liquid from the filter cake therebetween, the last tank of said series having an inlet for wash liquid, overflow means to flow wash liquid from a succeeding tank of the series to the next preceding tank, the first tank of the series having a wash liquid outlet, and means beyond the last of said wringer rolls for removing filter cake from said filtering belt.

5. The method of drying a mixture of a material and a filtrable liquid which comprises, forming said mixture into a ribbon-like shape and imparting to it a continuous traveling movement, mechanically compressing said mixture in the course of its travel to effect the expulsion of some of the liquid therefrom, passing the ribbon of partially dried material through a bath of wash liquid, again mechanically compressing said mixture while it continues its travel to expel therefrom wash liquid and an additional quantity of the liquid originally contained in the mixture and not expelled therefrom in the preceding mechanical compression, and breaking the dried ribbon and accumulating the dried material.

6. A filter comprising two endless belts, one of which is a filtering medium; means to propel said belts and move their opposing surfaces toward one another into fairly close approximation to thereby provide a mouth for the introduction between the belts of the mixture to be filtered; a plurality of pairs of wringer rolls between which the belts successively travel, the opposing driving faces of the rolls of a succeeding pair being spaced apart a smaller distance than the driving faces of the rolls of a preceding pair to thereby propel the belts into closer approximation, press liquid from the mixture and form between the belts a filter cake still containing a liquid portion; means to thenceforward propel the belts in parallel relationship in said closer approximation and at the same time convey them through a wash liquid and press therefrom the wash liquid and substantially the remainder of the fraction of original liquid contained in the original mixture; and means to thenceforward separate the belts and scrape the cake from the filter medium belt.

FREDERICK W. PADGETT.